Nov. 20, 1956 W. F. FARRELL 2,771,307
BANK CHECK
Filed Oct. 21, 1952 2 Sheets-Sheet 1

INVENTOR.
WILLIAM F. FARRELL
BY
ATTORNEY

Nov. 20, 1956 W. F. FARRELL 2,771,307
BANK CHECK
Filed Oct. 21, 1952 2 Sheets-Sheet 2

INVENTOR.
WILLIAM F. FARRELL
BY
ATTORNEY

United States Patent Office 2,771,307
Patented Nov. 20, 1956

2,771,307
BANK CHECK

William F. Farrell, Rochester, N. Y., assignor to Security Trust Company of Rochester, Rochester, N. Y.

Application October 21, 1952, Serial No. 315,939

4 Claims. (Cl. 283—58)

The present invention relates to a bank checking-account system and to checks for use therein.

The volume of banking business done in small checking accounts has increased steadily in the last several years, but though there is a charge made for each check drawn on such an account, and although the number of such checks which can be drawn per month are limited, banks have been finding that the cost of handling such checks has been threatening to exceed the charge per check. Furthermore, mistakes are often made in the handling of these small checking accounts in the systems heretofore used.

A few banks in the country have gone to I. B. M. machines to handle some of their checks. Checks for use on such machines are printed on thin cardboard-like material, and are perforated, so that when the checks have been cashed and returned to the banks they can be fed through the I. B. M. machines to sort them. The perforations in the checks given to a particular depositor are coded to correspond to that depositor's account.

The banks, which have gone to perforated checks, for handling by the I. B. M. machines, use a conventional seven and one-half inches long I. B. M. card stock. Such checks are too long, however, to be put in a pocket or pocketbook without folding; and they make up too bulky checkbooks. Hence they have not proved acceptable for use by small depositors or in small deposit accounts. Moreover, in the perforated checks heretofore used, the perforations, which identify the depositor's account, are put into each check on a standard I. B. M. machine, and the name of the depositor is printed on the check by running perforated checks through a printing machine. This step requires that the check be coded again so that the correct name of the depositor corresponding to the code of perforations on the check will be printed on the check. Furthermore, on a refill order for such checks, the record card of the depositor has to be used again to code the I. B. M. machine so that the new checks will be properly perforated and again there have to be coded the printing of the depositor's name and other identifying data on the checks. All this has made the perforated check unsuitable and impractical heretofore for use in small deposit accounts.

While a few banks have used a perforated card check which is folded, such are subject to considerable mutilation in actual use; and moreover, are open to all the objections previously mentioned. The conventional perforated checks are only satisfactory for commercial accounts.

One object of the present invention is to provide a check which will be suitable for account use and yet will not be of a size to be inconvenient to carry on the person.

Another object of this invention is to provide a form of check suitable for small accounts particularly, which will not require folding but will be of a size nevertheless to fit conveniently in the pocket or pocketbook of a depositor.

Another object of the invention is to provide a form of check which can be handled by I. B. M. equipment, improving the accuracy of the handling of small deposit accounts, and reducing costs.

A further object of the invention is to provide a checking account system for small depositors which will provide each depositor with a complete running record of his account in a compact package.

A further object of the invention is to provide a compact record keeping means and book of checks which can be carried readily by the depositor on his person.

A further object of the invention is to provide a simple means by which the customer can reorder blank checks.

Another object of the invention is to provide a checking account system in which the depositor is given with a book of checks a perforated reorder card by which a new batch of checks can be ordered, and which itself will act as a master in controlling the perforating and printing of the new supply of checks.

Another object of the invention is to provide a checking account system of the character described which will be personalized to the extent that the checks will bear the name of the depositor and have his account number punched therein.

Another object of the invention is to provide a checking account system which will permit used checks, when returned to the bank, to transfer the account name and number to a work card by I. B. M. equipment automatically.

Still another object of the invention is to provide a checking account system of the character described in which the processing of checks and deposits may be speeded up and by which increased accuracy in the handling of accounts can be obtained.

Other objects of the invention will be apparent hereinafter from the specification and from the recital of the appended claims.

In the drawings:

Fig. 1 is an elevation showing the front face of a combination perforated check blank and master control card made according to this invention and as perforated by the bank of issue;

Fig. 2 is a front elevation of a reorder card for the depositor's account;

Fig. 5 is an elevational view of one of the pages of the account book of the packet, showing the deposit record.

Figures 3, 4, 6:
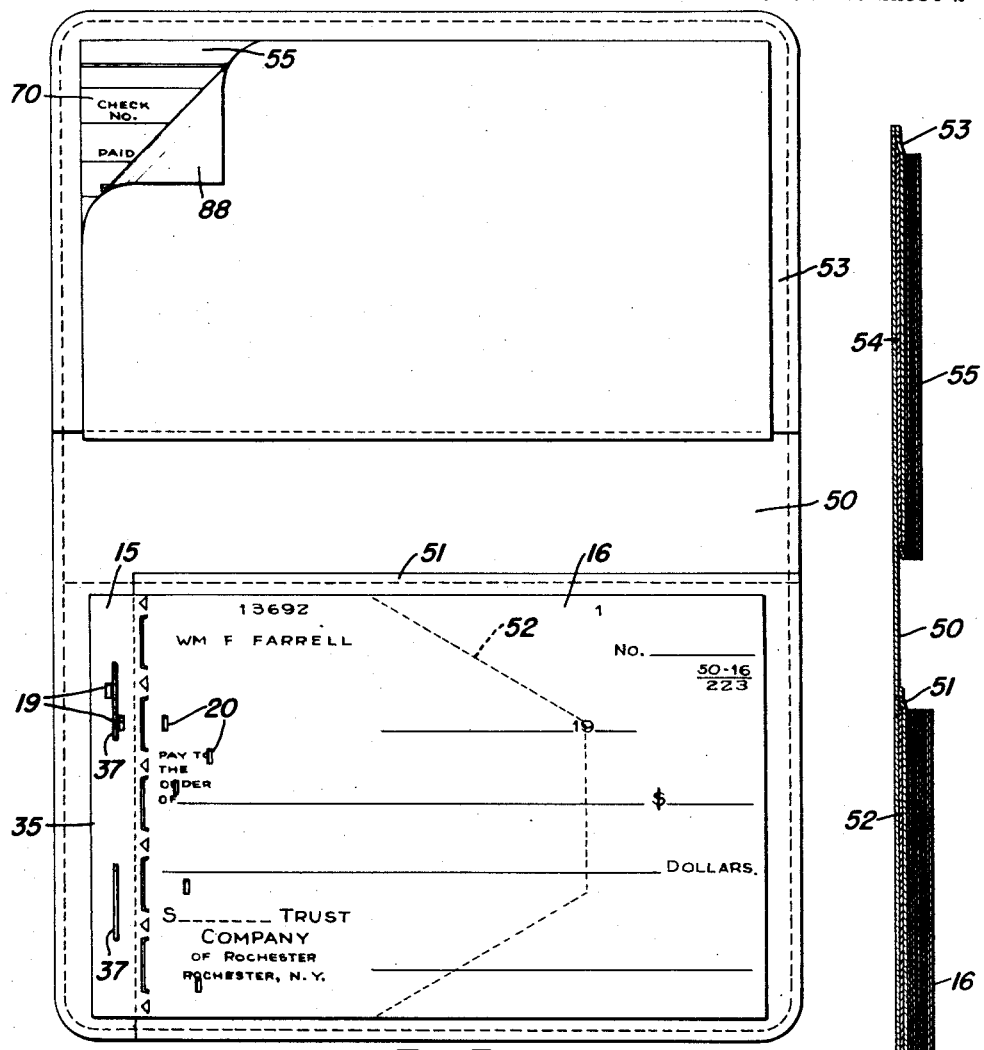
Fig. 3 is an elevation showing the pocket holder, with which each customer is supplied, opened up to expose the check book and the separate account book.
Fig. 4 is a transverse section through this opened holder.
Fig. 6 is an elevational view of a typical page of this account book by which the depositor can keep his own account of checks drawn, withdrawals, and deposits and the running balance.

One of the principal features of the present invention is the use of perforated card checks.

These checks are made by starting with a conventional size I. B. M. master card 10 which is scored along two separate lines as denoted at 11 and 12 so that the card is divisible into three sections, denoted, respectively, at 14, 15 and 16. The card 10 is run through a conventional I. B. M. machine to punch perforations 18 in the section 14 of the card corresponding to the name of the depositor, and simultaneously to punch perforations in the section 15 of the card corresponding to the bank branch, and simultaneously to punch perforations 20 in the section 16 of the card corresponding to the account number of the depositor. The perforations in the part 15 might if desired be put into the part 14, or part of the perforations in the part 14 might be, if desired, put into the part 15. The parts 14 and 15 together serve as a means for controlling imprinting of the checks, and are not used thereafter. The perforations 20, however, serve the purpose of permitting a check to be run through an I. B. M. machine, after it has been cashed and returned to the bank to transfer the account number to a work card for entry on the bank records of the amount of the check and recording of the new balance.

The section 16 of the blank check has a space 21 imprinted thereon for the number of the check, a space 22 for the date on which the check is drawn, a space 23 for the name of the payee, blank spaces 24 and 25 on which the amount, for which the check is drawn, may be written, the name 26 of the issuing bank, and a blank space 27 for the drawer's signature.

After this card has been perforated, it is run into a conventional I. B. M. machine where the perforations 18, 19 and 20 actuate the machine to print the name 30 of the depositor, the number 31 of the bank branch, and the number 32 of the depositor's account.

After the printing has been done, the section 14 of the card is thrown away, and the remainder of the check is stapled in a checkbook 35 (Fig. 3) consisting of a plurality of checks comprising sections 15 and 16. The staples 37 which bind the checks together are passed through the sections 15 of the checks; and the section 15 serves then only to provide stock for binding.

Bound in with the book of checks is a reorder card 40 (Fig. 2). This reorder card has two sections, one 15' by which it may be bound into the book of checks, and the other 16' which carries three groups of perforations, one group 18' corresponding to the group 18 of section 14 of master check card 10, which is coded for the depositor's name, another 19' which is coded for the bank branch and which corresponds to group 19 of the master check card 10, and a third 20' which is coded for the account number of the depositor and corresponds to group 20 of the master 10. In addition, this order form has imprinted on it the number 32 of the account, the name 30 of the depositor, a suitable order, as shown, on the bank of deposit for a new supply of checks, and blank spaces 42 for the depositor's name, and address.

A series of checks comprising the sections 15 and 16 of the blanks 10, and one order card 40 are bound into each book of checks given a depositor by staples passed through the stub sections 15 and 15'.

The depositor is furnished this book of checks in a leather pocket case 50 (Figs. 3 and 4) which has two pockets therein, one 51 adapted to receive the tab 52 which is stapled at the back of the book of checks and which is inserted in the pocket, and the other 53 which is adapted to receive a similar cardboard tab 54 on the back of a book containing a combined deposit record and record of checks drawn. The sections 16 and 16' of the checks and the reorder card are four and three-quarter inches long by three and one-quarter inches wide which is the same size as the conventional postal money order forms so that the whole kit is of a size to be conveniently put in a pocket or pocketbook.

In the record book 55 there are at the front several sheets 60 (Fig. 5), which may be printed on the front and back, if desired, or on one side, and which are for a deposit record of the account. These sheets have the name 61 of the bank imprinted thereon, and are provided with blank spaces 62 for the name and address of the depositor. The name and address of the depositor can be entered on the first sheet of the deposit record by the bank teller when he issues the book to a depositor. In addition columns 63, 64 and 65 are imprinted on each deposit record sheet for the dates and the amounts of the different deposits made and for the receiving tellers' initials.

The sheets 70 (Fig. 6) for the depositor's own record of his account have each two sections 71 for a record of two checks drawn. Each portion 71 has a blank space 73 for the number of the check, a blank space 74 for the date of the check, a blank space 75 for the name of the drawee, a blank space 76 in which to note the purpose for which the check was drawn, a blank space 77 in which to enter the amount of the check, a space 78 in which is printed the fee, usually ten cents, charged by the bank for processing the check, and a blank space 79 in which to enter the total of the check plus fee. In addition, in each section 71 there is a blank space 80 for entering the balance of the deposit account brought forward, a blank space 82 for entry of any deposit made between the time of that balance and the drawing of the check, a blank space 83 for the new balance, and a blank space 84 in which to enter the amount of the check and fee. In addition at the bottom of each page 70 there is a blank space 87' for entry of the balance left after the drawing of the two checks, that are recorded on that page. A cover leaf 88 may be provided to cover the record book 55 to prevent it from becoming soiled. The whole forms a very handy packet.

With the present invention it is possible to use a check which is approximately 4¾ inches by 3¼ inches, instead of the 7½" by 3¼" check previously required for use with I. B. M. machines.

The complete master check 10 is used first of all to control the imprinting of the depositor's name and account number, and of the branch of the bank. The perforations 20 in the section 16 of the check are used for sorting the checks by the I. B. M. machines after the checks have been cashed. The perforations in the reorder card 40 are used to control the production of perforations 18, 19 and 20 in a new set of checks and a new reorder card. The invention comprises making a check of standard punch card size 10 and using that check for controlling a printing operation on part of that check, and then using only part of the card for actual check purposes.

To prevent perforations from appearing in spaces 23 and 25 of the check which have to be written on, it is preferable to omit the numbers 4 and 5 from all account numbers of depositors in the small deposit system.

While the invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention what I claim is:

1. A combined master form and bank check comprising a sheet of paper which is scored on two parallel, transverse lines to form three separable sections, one of said sections constituting a check proper having places for the date, the name of the payee, the sum to be paid, and the signature of the drawer, and having printed matter thereon identifying the drawer, another section constituting a stub by which the check may be bound into a check book, and the third section having control indicia punched therein to control the printing of the first-named section and being adapted to be discarded after use for the printing purpose, said check section proper also being punched with control indicia, said latter control indicia identifying the account of the drawer of the check so that said latter control indicia constitutes sorting control indicia for use after the check has been cashed.

2. A combined master form and bank check comprising a sheet of paper which is scored on two parallel, transverse lines to form three separable sections, one of said sections constituting a check proper having places for the date, the name of the payee, the sum to be paid, and the signature of the drawer, and having printed matter thereon identifying the drawer, and a second section constituting a stub by which the check may be bound into a check book, the second and third sections being perforated with control indicia to control printing on the face of the check section proper of the name of the depositor and of indicia identifying the bank branch, said third section being adapted to be discarded after use for the printing purpose, and the check section proper being perforated with control indicia serving as sorting control indicia for use after the check has been cashed, said stub section being smaller than the other two sections and being disposed between the other two sections.

3. A combined master form and bank check comprising a sheet of paper which is scored on two parallel, transverse lines to form three separable sections, one of said sections constituting a check proper having places for the date, the name of the payee, the sum to be paid, and the signature of the drawer, and having printed matter thereon identifying the drawer, and another section constituting a stub by which the check may be bound into a check book, the third section being perforated with control indicia to control printing on the face of the first section of information identifying the drawer of the check, and the first-named section being perforated to provide sorting control indicia for use after the check has been cashed, said third section being adapted to be torn off and discarded after use for the printing purpose, and said stub section being disposed between the other two sections.

4. A combined master form and bank check comprising a sheet of paper which is scored on two parallel, transverse lines to form three separable sections, one of said sections constituting a check proper having places for the date, the name of the payee, the sum to be paid, and the signature of the drawer, and having printed matter thereon identifying the drawer, and another section constituting a stub by which the check may be bound into a check book, the third section being perforated with control indicia to control printing on the face of the first section of information identifying the drawer of the check, the second section being interposed between the first and third sections and being also perforated with control indicia to control printing on the face of the first section, and the first section also being perforated with sorting control indicia for identifying the drawer of the check after the check has been cashed and returned to the bank of issue, the third section being adapted to be torn off and discarded after use for the printing purpose.

References Cited in the file of this patent

UNITED STATES PATENTS

| | | |
|---|---|---|
| 735,081 | Franc | Aug. 4, 1903 |
| 1,099,708 | Lynch | June 9, 1914 |
| 1,200,056 | Wakefield | Oct. 3, 1916 |
| 1,570,786 | Schofield | Jan. 26, 1926 |
| 1,626,871 | Peirce | May 3, 1927 |
| 2,357,444 | Armbruster | Sept. 5, 1944 |
| 2,593,206 | Short | Apr. 15, 1952 |

FOREIGN PATENTS

| | | |
|---|---|---|
| 519,186 | Germany | Feb. 25, 1931 |